US009357379B2

(12) United States Patent
Bromell et al.

(10) Patent No.: US 9,357,379 B2
(45) Date of Patent: May 31, 2016

(54) NETWORK ELEMENT, INTEGRATED CIRCUIT, CELLULAR COMMUNICATION SYSTEM AND METHOD THEREFOR

(71) Applicant: ip.access Limited, Cambridge, Cambridgeshire (GB)

(72) Inventors: John Yearsley Bromell, Great Chesterford Essex (GB); Nicholas Dougall Johnson, Cambs (GB)

(73) Assignee: ip.access Limited, Cambridge, Cambridgeshire (GB)

(*) Notice: Subject to any disclaimer, the term of this patent is extended or adjusted under 35 U.S.C. 154(b) by 0 days.

(21) Appl. No.: 14/372,623

(22) PCT Filed: Jan. 17, 2013

(86) PCT No.: PCT/EP2013/050865
§ 371 (c)(1),
(2) Date: Jul. 16, 2014

(87) PCT Pub. No.: WO2013/110543
PCT Pub. Date: Aug. 1, 2013

(65) Prior Publication Data
US 2014/0378125 A1 Dec. 25, 2014

(30) Foreign Application Priority Data

Jan. 17, 2012 (GB) .................................. 1200757.1

(51) Int. Cl.
*H04W 60/02* (2009.01)
*H04W 8/24* (2009.01)
(Continued)

(52) U.S. Cl.
CPC ................ *H04W 8/24* (2013.01); *H04W 24/10* (2013.01); *H04W 60/02* (2013.01); *H04W 88/08* (2013.01)

(58) Field of Classification Search
CPC ....... H04W 24/10; H04W 60/02; H04W 8/24; H04W 88/08
USPC ...................................................... 455/422.1
See application file for complete search history.

(56) References Cited

U.S. PATENT DOCUMENTS

2009/0247176 A1    10/2009  Song et al.
2010/0182919 A1*    7/2010  Lee ....................... H04W 24/10
                                                     370/252

(Continued)

FOREIGN PATENT DOCUMENTS

EP    2384069 A     11/2011
EP    2437552 A1    4/2012
(Continued)

OTHER PUBLICATIONS

International Search Report and Written Opinion, date of mailing Jul. 23, 2013 for PCT/EP2013/050865 (28 pgs.).
(Continued)

*Primary Examiner* — Nathan Taylor
(74) *Attorney, Agent, or Firm* — Fitch, Even, Tabin & Flannery LLP

(57) ABSTRACT

A network element comprises a signal processor supporting communications between a subscriber unit (UE) and a core network (CN). The signal processor is arranged to: receive a first update request message (location or routing area) from the subscriber unit; forward the first update request message to the core network; receive from the CN a first update accept (or response) message; store at least a part of the accept message content; forward the first update response message to the subscriber unit; receive a second update request from the subscriber unit; create a second update accept (or response) message using the at least part of the stored content; and respond to the subscriber unit second update accept (or response) message direct.

14 Claims, 11 Drawing Sheets

(51) Int. Cl.
*H04W 24/10* (2009.01)
*H04W 88/08* (2009.01)

(56) References Cited

U.S. PATENT DOCUMENTS

| | | | | |
|---|---|---|---|---|
| 2011/0103277 A1* | 5/2011 | Watfa | H04W 36/0033 | 370/310 |
| 2011/0195715 A1* | 8/2011 | Wu | H04W 36/0088 | 455/436 |
| 2011/0268092 A1* | 11/2011 | Tiwari | H04W 60/02 | 370/335 |
| 2012/0077490 A1* | 3/2012 | Kawabe | H04W 48/20 | 455/433 |
| 2012/0115454 A1* | 5/2012 | Liao | H04W 60/02 | 455/418 |
| 2013/0017829 A1* | 1/2013 | Kim | H04W 60/06 | 455/435.1 |

FOREIGN PATENT DOCUMENTS

| | | |
|---|---|---|
| EP | 2451228 A | 5/2012 |
| WO | 2009139675 A1 | 11/2009 |
| WO | 2010137698 A1 | 12/2010 |

OTHER PUBLICATIONS

LG Electronics: "3GPP TSG-RAN WG2 Meeting #58; R2-071928; Discussion on Data Transmission in CELL_PCH", 3GPP Draft; R2-071928 DATA_CELLPH_R1, 3rd Generation Partnership Project (3GPP), Mobile Competence Centre; 650, Route Des Lucioles; F-06921 Sophia-Antipolis Cedex; France, vol. RAN WG2, No. Kobe, Japan; 20070504, May 4, 2007, pp. 1-4, XP050134814, [retrieved on May 4, 2007] p. 1, "1 introduction"; p. 3, Fig. 3; pp. 3-4, "4 RRC measurement reporting in CELL_PCH".

UK Search Report for Application No. GB1300877.6 issued Jul. 17, 2013.

* cited by examiner

NETWORK ELEMENT, INTEGRATED CIRCUIT, CELLULAR COMMUNICATION SYSTEM AND METHOD THEREFOR

CROSS REFERENCE TO RELATED APPLICATIONS

This application is a national phase application of International Application No. PCT/EP2013/050865, filed Jan. 17, 2013, claiming priority to Great Britain Application No. 1200757.1, filed Jan. 17, 2012, which are incorporated by reference herein in their entirety.

FIELD OF THE INVENTION

The field of this invention relates to a network element, a cellular communication system and a method therefore. The invention is applicable to, but not limited to, a network element within a cellular communication system, and a method for collecting frequent measurements from mobile stations/user equipment.

BACKGROUND OF THE INVENTION

Wireless communication systems, such as the 3$^{rd}$ Generation (3G) of mobile telephone standards and technology, are well known. An example of such 3G standards and technology is the Universal Mobile Telecommunications System (UMTS™), developed by the 3$^{rd}$ Generation Partnership Project (3GPP™) (www.3gpp.org). The 3$^{rd}$ generation of wireless communications has generally been developed to support macro-cell mobile phone communications. Such macro cells utilise high power base stations (NodeBs in 3GPP™ parlance) to communicate with wireless communication units within a relatively large geographical coverage area. Typically, terminal devices (sometimes referred to as wireless communication units, or User Equipment (UEs) as they are often referred to in 3G parlance), communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The 3GPP has subsequently defined a further generation of mobile telephone standards, known as Long Term Evolution (LTE), which is commonly referred to as 4G. In LTE, a base station is known as an Evolved Node B (abbreviated to eNodeB or eNB). An eNB connects directly to the LTE core network, which is known as the Evolved Packet Core (EPC), there being no equivalent in LTE of the 3G RNC.

Lower power (and therefore smaller coverage area) cells are currently referred to as 'small' cells, with the term femto cells or pico cells typically reserved to refer to a residential small cell. Hereafter, the term small cells will be used to encompass femto cells, pico-cells or similar. Small cells are effectively communication coverage areas supported by low power base stations (otherwise referred to as Access Points (APs) with the term Home Node Bs (HNBs) identifying femto cell access points). These small cells are intended to augment the wide area macro network and support communications to UEs in a restricted, for example indoor, environment. An additional benefit of small cells is that they offload traffic from the macro network to small cells, thereby freeing up valuable macro network resources.

Typical applications for such small cell base stations include, by way of example, residential and commercial (e.g. office) locations, communication 'hotspots', etc., whereby HNBs can be connected to a core network via, for example, the Internet using a broadband connection or the like. In this manner, small cells can be provided in a simple, scalable deployment in specific in-building locations where, for example, UEs may come into close proximity to a small cell base station. Small cell base stations are intended to enhance the coverage of a UMTS™ Radio Access Network (RAN) within residential and/or private commercial environments, and it is planned that the number of small cell base stations in a macro cell may number thousands.

The 3GPP Standards for UMTS specify a use of T3212 and/or T3312 timer values. These timer values are broadcast by a cell in its system information or received from the Core Network (CN). The T3212 timer value specifies how often a UE in the cell should perform a location update. The T3312 timer value specifies how often a UE in the cell should perform a routing area update. T3212 is broadcast by a cell in its system information. T3312 is not broadcast in system information, but is instead sent by the core network to a specific UE in GMM Attach Accept and GMM Routing Area Update Accept messages. Similarly, the 3GPP standards for LTE specify the use of a timer T3412. The T3412 timer value specifies how often a UE in an LTE cell should perform the periodic tracking area update procedure. The value of timer T3412 is sent by the EPC to a specific UE in Attach Accept and Tracking Area Update Accept messages.

The interval between periodic location/routing/tracking area updating procedures is typically configured by the network operator. These location update, routing area update and tracking area update procedures provide opportunities for the network to collect measurement information from a UE. However, the T3212, T3312 and T3412 timer values are usually configured to longer periods than is desirable for the purpose of collecting measurement information.

Radio parameter settings for macro networks are typically set by the network operator by a process of "cell planning", which uses a model of the cell deployment to predict coverage and capacity with different parameter values. They typically back this up with drive testing, where they measure actual RF signal strength and quality as well as service performance. These approaches are possible because the location and environment of each macro cell is known; this is not the case with small cells. The (potentially) very large number of small cells and the fact that they are typically deployed in private residences means that it is not feasible for the operator to determine the RF parameters for each cell individually, Therefore small cells have to be self-configuring either individually or in conjunction with each other—this technology is known as Self-Organising Networks (SON).

SUMMARY OF THE INVENTION

Accordingly, the invention seeks to mitigate, alleviate or eliminate one or more of the above mentioned disadvantages, either singly or in any combination. Aspects of the invention provide a communication unit, an integrated circuit, a cellular communication system, and a method therefore, as described in the appended claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1:
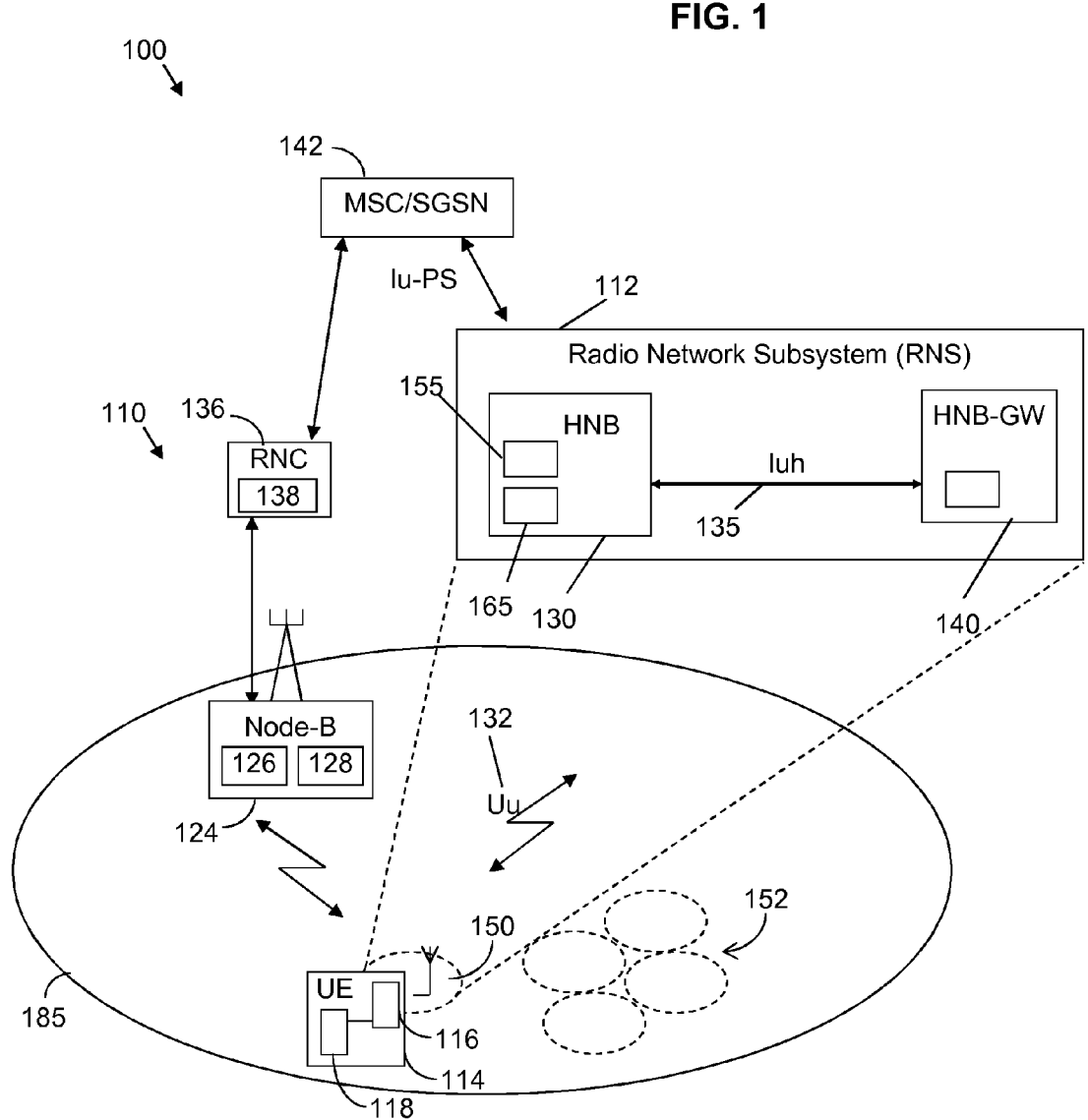
FIG. 1 illustrates an example of part of a cellular communication system.

Examples of the invention will be described in terms of a network element within a 3rd generation (3G) Radio Network Sub-system (RNS) for supporting one or more small cells within a Universal Mobile Telecommunications System (UMTS™) cellular communication network and in terms of a network element within a Long Term Evolved (LTE) communication system. However, it will be appreciated by a skilled artisan that the inventive concept herein described may be embodied in any type of network element for supporting communications within a cellular communication network. In particular, it is contemplated that the inventive concept is not limited to being implemented within a network element for supporting one or more small cells within a UMTS™ cellular communication network, but may be equally applied within one or more network element(s) adapted to support any type of communication cell, e.g. one or more macro cells, and/or adapted in accordance with alternative cellular communication technologies. Similarly, although examples of the invention are described with reference to requesting more or less frequent measurements from a user equipment (UE), it is envisaged that the inventive concept may be applied to any type of terminal device or subscriber communication unit.

In examples of the invention, a network element in the radio access network is arranged to collect measurements during more frequent location updating procedures, advantageously without increasing the signaling load on the core network.

As mentioned, the 3GPP Standards specify a use of T3212, T3312 and/or T3412 timer values. These timer values are either broadcast by a cell in its system information or received from the Core Network. The T3212 timer value specifies how often a UE in the cell should perform a location update. The T3312 timer value specifies how often a UE in the cell should perform a routing area update. The T3412 timer value specifies how often a UE in an LTE cell should perform a tracking area update. The interval between periodic location/routing/tracking area updating procedures is typically configured by the network operator. The interval must be chosen so as to balance a need to check a UE's location (and possibly update its temporary identity) against the increased signaling load imposed on the core network as a consequence of more frequent location/routing/tracking area updates. In accordance with some example embodiments of the present invention, timer values, such as T3212, T3312 and/or T3412, are adapted such that they specify a shorter interval time period than is desirable from a point of view of the core network.

Within the 3GPP forums, various aspects of self-configuring small cell base stations and so-called self-organising networks (SON) have been discussed whereby the self-configuration depends upon obtaining measurements from UEs. Such measurements can be obtained when the user makes calls, as well as when the UE performs periodic signaling procedures, such as location updating, routing area updating and tracking area updating. These measurements may include, for example, measurements of the signal strength and/or signal quality of the serving cell and/or of neighbouring cells, which may be of the same radio access technology or the serving cell and either using the same frequency (so-called intra-frequency cells) or a different frequency (so-called inter-frequency cells) or they may be of a different radio access technology (so-called inter-RAT cells). Alternatively, or additionally, the measurements may include quality measurements, UE internal measurements and/or UE positioning measurements.

Referring now to the drawings, and in particular FIG. 1, a simplified example of part of a cellular communication system is illustrated and indicated generally at 100. In FIG. 1, there is illustrated an example of a communication system in a form of a third generation partnership project (3GPP™) Universal Mobile Telecommunication System (UMTS™) network 100 that comprises a combination of a macro cell 185 and a plurality of small cells 150, 152. For the example embodiment illustrated in FIG. 1, radio network sub-systems (RNSs) comprise two distinct architectures to handle the respective macro cell and small cell communications.

In the macro cell scenario, the RNS 110 comprises a controller in a form of a Radio Network Controller (RNC) 136 having, inter alia, one or more signal processing module(s) 138. The RNC 136 is operably coupled to at least one NodeB 124 for supporting communications within the macro cell 185. The NodeB 124 comprises signal processing module 126 and transceiver circuitry 128 arranged to enable communication with one or more wireless communication units located within the general vicinity of the macro communication cell 185, such as User Equipment (UE) 114. The RNC 136 is further operably coupled to a core network element 142, such as a serving general packet radio system (GPRS) support node (SGSN) and/or a mobile switching centre (MSC), as known.

In a small cell scenario, an RNS 112 comprises a base station 130 (e.g. also known as an access point or a Home NodeB (HNB)), that is arranged to perform a number of functions generally associated with a cellular communication base station, and a controller in a form of a Home NodeB Gateway (HNB-GW) 140. As will be appreciated by a skilled artisan, a base station is a communication element that supports communications within a communication cell, such as a small cell 150, and as such may provide access to a cellular communication network via the small cell 150. One envisaged application is that a base station 130 may be purchased by a member of the public and installed in their home. The base station 130 may then be connected to an HNB-GW 140 via an Iuh interface 135, for example implemented over, say, the owner's broadband internet connection (not shown).

Thus, a base station 130 may be considered as encompassing a scalable, multi-channel, two-way communication device that may be provided within, say, residential and commercial (e.g. office) locations, communication 'hotspots' etc., to extend or improve upon network coverage within those locations. An example of a typical third generation (3G) base station for use within a 3GPP™ system may comprise some NodeB functionality and some aspects of radio network controller (RNC) 136 functionality. For the illustrated example embodiment, the base station 130 comprises signal processing module 165 and transceiver circuitry 155 arranged to enable communication with one or more wireless communication units located within the general vicinity of the small communication cell 150, such as User Equipment (UE) 114, via a wireless interface (Uu) 132.

The 3G HNB-GW 140 may be coupled to the core network (CN) 142 via an Iu interface, such as the packet switched Iu interface, Iu-PS and/or the circuit-switched Iu interface, Iu-CS, as shown. In this manner, the base station 130 is able to provide voice and data services to a cellular handset, such as UE 114, in a small cell, in the same way as a conventional NodeB would in a macro cell, but with the deployment simplicity of, for example, a Wireless Local Area Network (WLAN) access point.

This first base station 130 comprises signal processing module 165 enable communication between the base station 130 and one or more wireless communication units located within the general vicinity of a small communication cell 150 (FIG. 1) supported thereby, such as UE 114, via a wireless interface (Uu) 132. The first base station 130 is operably coupled to the HNB-GW 140 via an Iuh interface 135, which in turn may be operably coupled to a core network of the cellular communication system via, say, an Iu-PS interface and/or an Iu-CS interface, as illustrated in FIG. 1. In accordance with some example embodiments of the present invention, a network element, such as the base station 130 of FIG. 1, is arranged to collect frequent measurements from mobile station/user equipment, such as UE 114, located within at least one communication cell, say cell 150 of a cellular communication network 185. The network element comprises a signal processing module, for example the signal processing module 165 in the case of base station 130, operably coupled to transceiver circuitry 155 and arranged to collecting frequent measurements from mobile station/user equipment.

A network element, such as base station 130, supports communications between a subscriber unit, such as UE 114 and a core network (CN). The network element comprises: a transceiver, memory and a signal processor operably coupled to the transceiver and memory. The signal processor is arranged to: receive a first update request message from the subscriber unit; forward the first update request message to the core network; receive from the CN a first update response message; extract and store in memory at least a part of the first update response message content; forward the first update response message to the subscriber unit; receive at least one second update request from the UE; create at least one second update response message using the at least part of the stored content; and respond directly to the subscriber unit with the at least one second update response message.

In some examples, as illustrated in FIG. 4, FIG. 6, FIG. 8 and FIG. 10, the signal processor 165 may create the at least one second update response message using the at least part of the stored content and respond directly to the subscriber unit with the at least one second update response message without passing the second update request to the CN.

In some examples, for example in a case of location area updating, the signal processor 165 may modify the value of a (T3212) timer value contained in a system information message that is broadcast by the network element.

In some examples, the signal processor 165 may forward the first update response message to the subscriber unit by modifying a timer value contained within the first update response message. The modified timer value may set a periodicity of an update message procedure employed by the subscriber unit. The signal processor 165 may be arranged to modify the timer value by increasing a frequency of second update request messages employed by the subscriber unit by a multiplying integer factor.

Furthermore, and in accordance with some example embodiments of a further aspect of the present invention, there may be provided a network element, such as base station 130 once again, for collecting frequent measurements from mobile station/user equipment, such as UE 114, located within at least one communication cell, say cell 150 of a cellular communication network 185. The network element comprises a signal processing module, for example the signal processing module 165 in the case of the base station 130, arranged to modify one or more of a T3212 timer value for a location update request message and/or modify a T3312 timer value for a routing area update request message and/or modify a T3412 timer value for a tracking area update request message.

Some 3G UEs (e.g. USB dongles) only support packet-switched (PS) data services and will therefore perform routing area updates but not location updates. Hence, examples of the invention in PS data service implementations may use periodic routing area updates. Other UEs might have data services disabled (or conceivably might not support data services at all) and so will perform location updates but not routing area updates. Hence, examples of the invention in implementations where UEs have data services disabled, may use periodic location updates. Other UEs may support both circuit-switched and packet-switched services and will therefore perform both location updates and routing area updates: in this case we could choose to increase the frequency of either periodic location updates or periodic routing area updates or both.

Note that if the intention is to use the more frequent procedures to ask the UE to carry out additional measurements, the periodic routing area update approach may offer an advantage that the standards allow the network to keep the RR connection open following the update for an indeterminate period. This is in contrast to the location update approach, where if the UE did not set a "follow-on request" flag, and the network has not released the RR connection within 10 seconds of sending the Location Updating Accept message, the UE will abort the RR connection itself.

In accordance with example embodiments of the invention, in the UMTS case one or both of the T3212 and/or T3312 timer values are made shorter for example by signal processing module 165, than that which is desirable from the point of view of the core network. In accordance with example embodiments of the invention the handling of one or both of the resulting more frequent Location Updating Request and/ or Routing Area Update Request messages is performed purely within the radio access network, thereby avoiding signaling to the core network associated with these additional messages. Similarly, in the LTE case, the T3412 timer value is made shorter than that which is desirable from the point of view of the core network, and the handling of the resulting more frequent Tracking Area Update Request messages is purely performed within the radio access network, thereby avoiding signaling to the core network associated with these additional messages.

In this manner, the communication unit, for example in a form of an access point (AP) is enabled to obtain frequent measurements from Idle UEs without increasing the signaling load on the core network.

In some examples, the signal processing module 165 of the base station may be adapted to temporarily increase the frequency of location/routing area update procedures when additional measurement information is needed and that the base station can revert to the frequency set by the network operator as soon as sufficient measurements have been collected. The period of increased frequency could begin, for example, when the base station is started up or when previous measurements are considered to have become 'stale' (after a configured period of time), or a period of time determined by the AP. A similar approach can be taken in the case of LTE.

In order to better explain examples of the invention, let us first consider the following scenario. Let us suppose that the Network Operator of the communication system of FIG. 1 wishes UEs (such as UE 114) to send Location Updating Request messages to the core network once per hour, but the base station 130 wishes to obtain measurements from these UEs once every '6' minutes. The base station 130 broadcasts the value of the periodic location updating timer T3212 in its system information. According to 3GPP 24.008, this value is in units of decihours and can take values ranging from '1' to '255' (and '0', which means disable periodic location updating). In this example, instead of broadcasting a value of 10 decihours (that is, one hour) for T3212, the base station 130 is configured to broadcast a timer value of '1' (that is, in this example, a periodic frequency of '6' minutes). The base station 130 tracks the identity of each UE 114 that enters the cell and performs a normal location update. A UE is typically allocated a temporary mobile station identifier (TMSI) by the core network at this point. For each UE 114 that performs periodic location updates, the base station 130 maintains a counter that it uses to decide whether a given periodic location update should be handled locally or passed to the core network. In this example, nine out of every ten periodic Location Updating Request messages are intercepted and responded to by the base station 130, and every tenth periodic Location Updating Request message is passed on to the core network as per standard 3GPP-defined procedure.

In some examples, the above ratio of 10:1 may be a different value. In some examples, the ratio may be made dynamic, for example dependent upon the prevailing radio access network (RAN) conditions. When the base station 130 responds to a periodic Location Updating Request message itself, the base station 130 ensures that the message contents are such that the state of the UE 114 remains unchanged (e.g. if the last Location Updating Accept message sent to the UE 114 by the core network included a list of equivalent PLMNs, the Location Updating Accept message sent by the base station 130 shall include the same list.) In some examples, the same principles as provided above may apply if periodic routing area updating were used instead of periodic location updating, or if periodic tracking area updating were used in an LTE network. Although, in some examples, the core network signaling is kept at the same level, the radio access network signaling has increased. This will affect UE battery life. Therefore, examples of the invention employ only a temporary increase in frequency to minimise any adverse effect on RAN signaling and therefore UE battery life.

In some examples, embodiments of the invention may allow a base station to collect additional UE measurements, for example via RRC Connection Request messages or RRC Measurement Report messages, that, in turn, may lead to the benefit of improved performance in respect of handover, cell re-selection and RRC re-direction, based on the RF conditions that are to be found in the cell.

Figure 2:
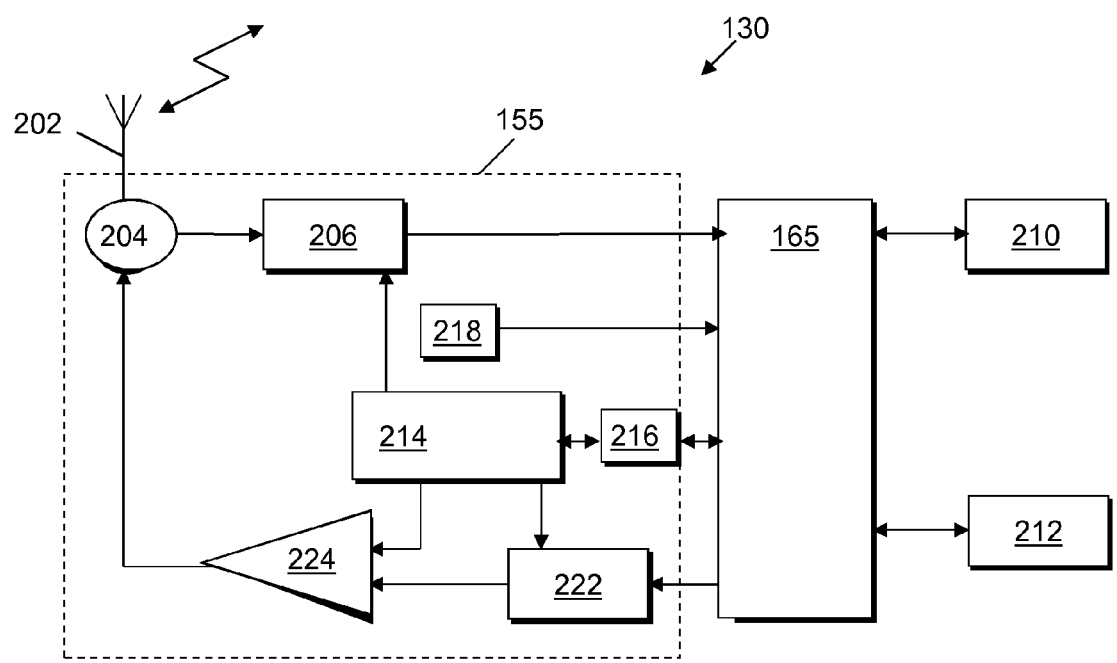
FIG. 2 illustrates an example of a simplified block diagram of a communication unit adapted in accordance with an example embodiment.

Referring now to FIG. 2 for completeness, an example of a simplified block diagram of a small cell base station 130 is shown. The example small cell base station 130 contains an antenna 202 coupled to the transceiver circuitry 155. More specifically for the illustrated example, the antenna 202 is preferably coupled to a duplex filter or antenna switch 204 that provides isolation between receive and transmit chains within the small cell base station 130.

The receiver chain, as known in the art, includes receiver front-end circuitry 206 (effectively providing reception, filtering and intermediate or base-band frequency conversion). The front-end circuitry 206 is serially coupled to the signal processing module 165. An output from the signal processing module 165 is provided to a transmit element of a network connection 210, for example operably coupling the signal processing module 165 to the HNB-GW 140 of FIG. 1 via, say, the Internet (not shown). The controller 214 is also coupled to the receiver front-end circuitry 206 and the signal processing module 165 (typically realised by a digital signal processor (DSP)). The controller 214 and signal processing module 165 are also coupled to at least one memory device 216 that selectively stores operating regimes, such as decoding/encoding functions, synchronisation patterns, code sequences, event measurement report data and the like.

As regards the transmit chain, this essentially includes a receiving element of a network connection 210, coupled in series through transmitter/modulation circuitry 222 and a power amplifier 224 to the antenna 202. The transmitter/ modulation circuitry 222 and the power amplifier 224 are operationally responsive to the controller 214, and as such are used in transmitting data to a wireless communication unit, such as UE 118.

The signal processor module 165 in the transmit chain may be implemented as distinct from the processor function in the receive chain. Alternatively, a single processor may be used to implement processing of both transmit and receive signals, as shown in FIG. 2. Clearly, the various components within the small cell base station 130 can be realised in discrete or integrated component form, with an ultimate structure therefore being merely an application-specific or design selection. In accordance with examples of the invention, the memory 216 stores computer-readable code thereon for programming the signal processing module 165 as well as information from at least a part of the first update response message content, for example timer information, received from the CN within a first update response message; that is extracted and stored in memory 216, for subsequent use in intercepting update request messages and providing update response messages directly in response thereto.

The network element comprises a signal processing module, for example the signal processing module 165 in the case of the base station 130, arranged to modify one or both of the T3212 and/or T3312 timer values, or in the case of LTE, T3412.

Examples of the invention may be embodied in any access point or enterprise 3G base station 130 that needs SON capability. Furthermore, examples of the invention may be applied to open, closed and hybrid access cells.

Some examples of this invention are applicable to UMTS™ networks. In standard UMTS™ networks, a UE that is MM attached (i.e. has registered with the Circuit-Switched core network) performs periodic location updating at intervals determined by timer T3212, which is broadcast by the Node B in its System Information. A UE that is GMM attached (i.e. has registered with the Packet-Switched core network) performs periodic routing area updating at intervals determined by timer T3312, which is sent to the UE in GMM Attach Accept and Routing Area Update Accept messages. A UE that is both MM attached and GMM attached performs both periodic location updating and periodic routing area updating at intervals determined by timers T3212 and T3312 respectively.

Some examples of this invention are applicable to LTE networks. In standard LTE networks, a UE that is EMM registered (i.e. has registered with the Enhanced Packet Core) performs periodic tracking area updating at intervals determined by timer T3412, which is sent to the UE in Attach Accept and Tracking Area Update Accept messages.

In accordance with example embodiments of this invention, in a UMTS™ scenario, the base station can operate in/support one of two periodic location/routing area updating modes, Mode A and Mode B. In Mode A, the interval between updates is as configured by the network operator. In Mode B, the interval between updates may be reduced by the base station in order to obtain more frequent measurements.

In Mode A, the value of the timer governing the frequency of periodic location updates is T3212_MODE_A. In Mode B, the value of the timer governing the frequency of periodic location updates is T3212_MODE_B and is such that T3212_MODE_A is an exact multiple of T3212_MODE B. That is, T3212_MODE_A=M×T3212_MODE_B, where M is a positive integer greater than 1. In this manner, the signal processor of the base station may determine what percentage of received UE measurements to route to the Core Network based on the modified T3212 value, as controlled by the factor 'M'.

In Mode A, the value of the timer governing the frequency of periodic routing area updates is T3312_MODE_A. In Mode B, the value of the timer governing the frequency of periodic routing area updates is T3312_MODE_B and is such that T3312_MODE_A is an exact multiple of T3312_MODE B. That is, T3312_MODE_A=N×T3312_MODE_B, where N is a positive integer greater than 1.

In Mode A, the value of the timer governing the frequency of periodic tracking area updates is T3412_MODE_A. In Mode B, the value of the timer governing the frequency of periodic tracking area updates is T3412_MODE_B and is such that T3412_MODE_A is an exact multiple of T3412_MODE B. That is, T3412_MODE_A=N× T3412_MODE_B, where N is a positive integer greater than '1'.

A UE that is registered with the UMTS circuit switched network is known as "MM attached". A UE that is registered with the UMTS packet switched network is known as "GMM attached". A UE that is MM attached, but not GMM attached, performs periodic location area updating. A UE that is GMM attached, but not MM attached, performs periodic routing area updating. A UE can be both MM attached and GMM attached at the same time. Some networks support combined routing area and location area updating whereby a UE that is both MM and GMM attached need only perform one periodic updating procedure. In networks that do not support combined routing area and location area updating a UE that is both MM attached and GMM attached has to perform separate periodic updating procedures, one for location updating and one for routing area updating.

As an optimisation in a network that does not support combined routing area and location area updating, the interval between routing area updates may be reduced for UEs that are only GMM attached but not for UEs that are both MM attached and GMM attached, which will already be doing more frequent updates.

Since in Mode B a UE has to communicate with the base station more frequently than in Mode A, its battery life will be adversely affected to some extent and therefore it may be advantageous to arrange for Mode B to be activated from time to time rather than permanently. Possible triggers for switching from Mode A to Mode B include:
  Cell set up
  A (configurable) period has elapsed after Mode A was last entered
  Measured base station performance falls below a (configurable) threshold
  Possible triggers for switching from Mode B to Mode A include:
  A configurable period has elapsed after Mode A was last entered
  The number of measurements received since last entering Mode B has exceeded a (configurable) threshold.

Figure 3:
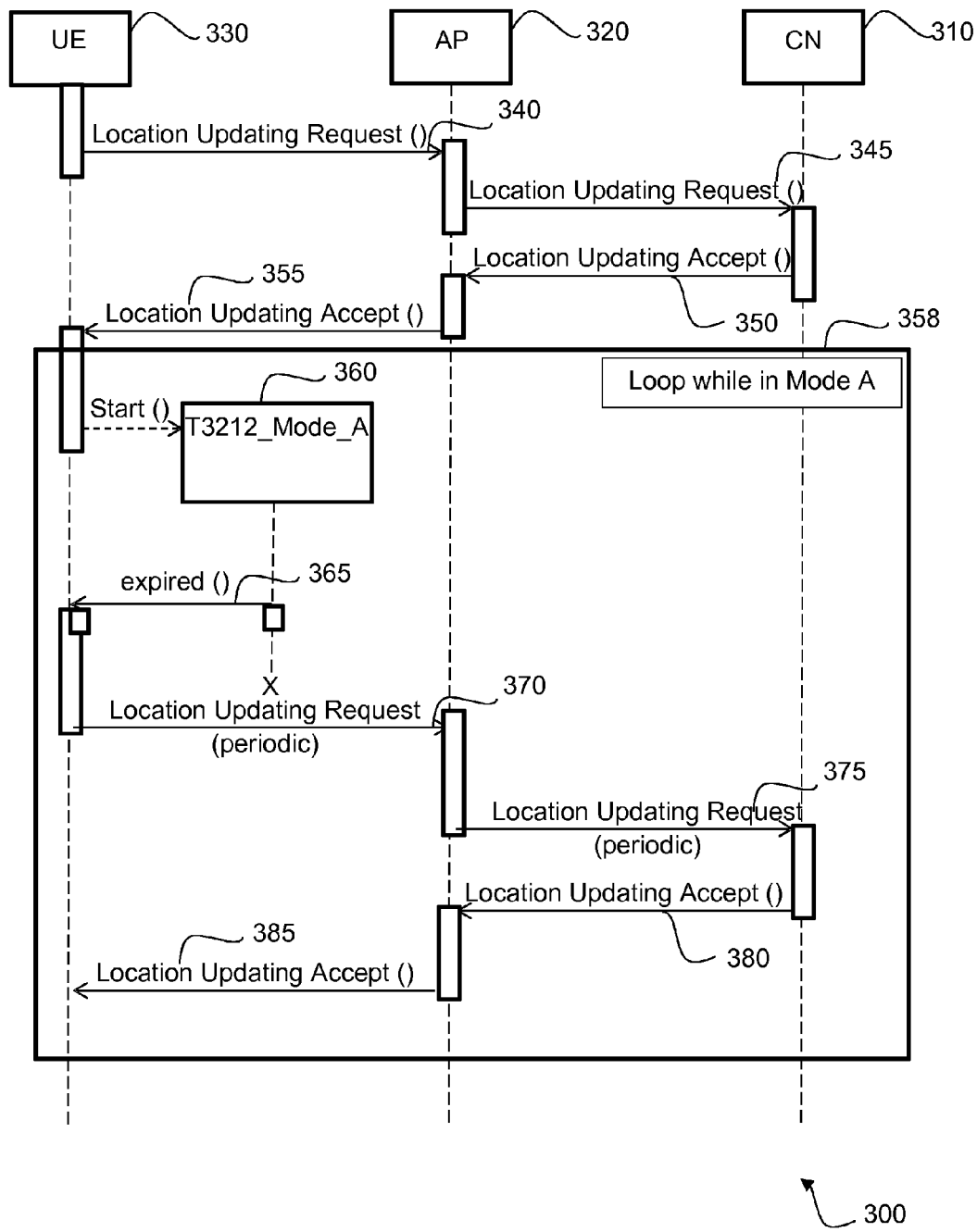
FIG. 3 shows a message sequence chart illustrating periodic location updating in Mode A according to standard UMTS network behaviour.

FIG. 3 shows an example message sequence chart 300 illustrating periodic location updating in Mode A (according to UMTS network behaviour). The example message sequence chart 300 illustrates communications between a terminal device, such as a user equipment (UE) 330, a base station, such as a small cell access point (AP) 320 and a core network (CN) 310. The example message sequence chart 300 first shows the UE 330 transmitting a location updating request message 340 to the AP 320. The location updating request message is forwarded in 345 to the CN 310 and a location updating accept message 350 returned to the AP 320, which in turn is forwarded in 355 to the UE 330.

A timer, for example timer T3212_mode_A timer 360 is started. Thereafter periodic location updates are performed, as shown, with UE 330 transmitting a periodic location updating request message 370 to the AP 320; the periodic location updating request message being forwarded in 375 to the CN 310 and a location updating accept message 380 returned to the AP 320, which in turn is forwarded in 385 to the UE 330. This loop 358 continues until the UE either becomes connected to the circuit switched network for a purpose other than periodic location updating, such as making a voice call, or the UE leaves the cell.

Figure 4:
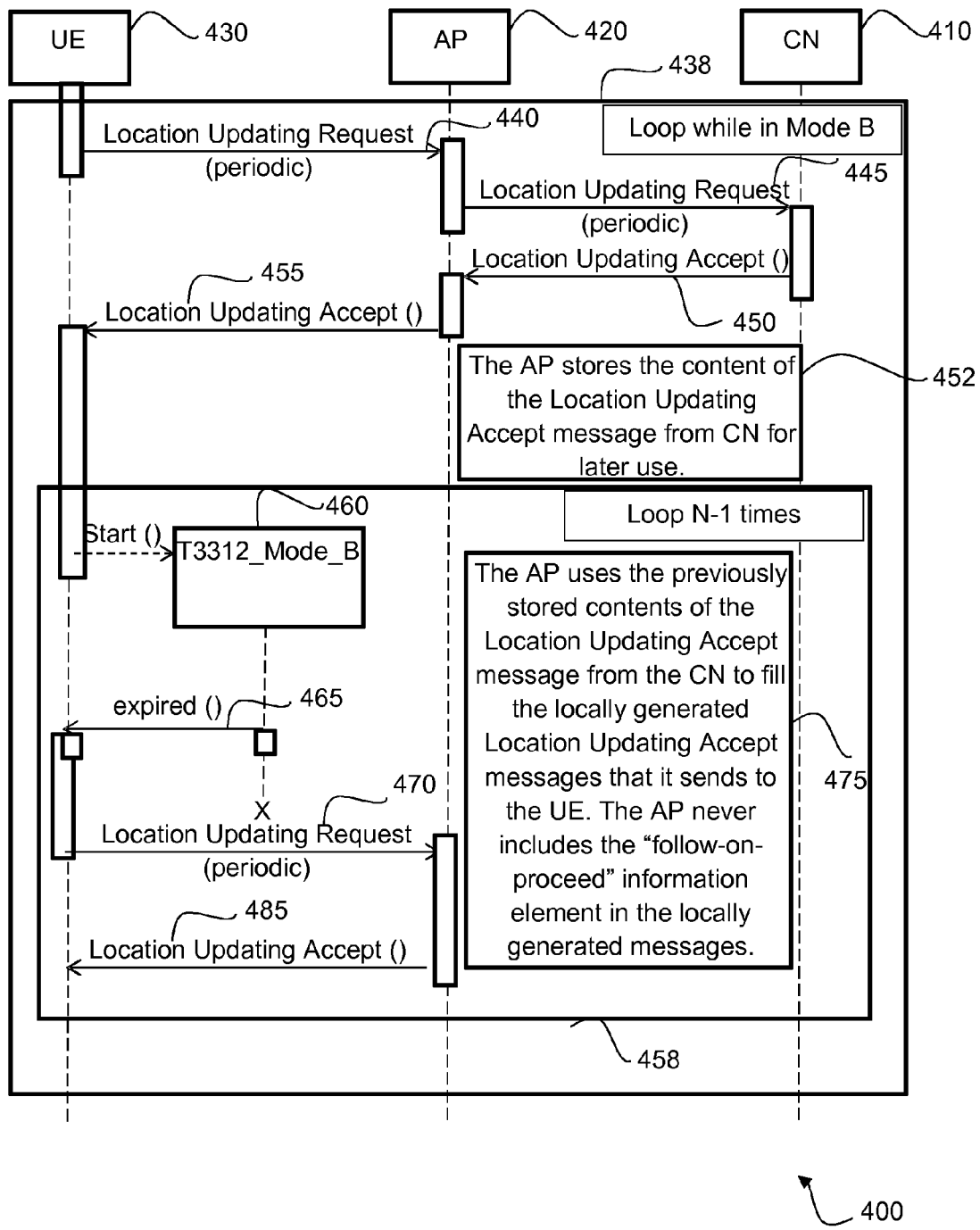
FIG. 4 shows a message sequence chart illustrating periodic location updating in Mode B according to examples of the present invention.

FIG. 4 shows an example message sequence chart 400 illustrating periodic location updating in Mode B according to examples of the present invention.

The example message sequence chart 400 illustrates communications between a terminal device, such as a user equipment (UE) 430, a base station, such as a small cell access point (AP) 420 and a core network (CN) 410. The example message sequence chart 400 commences a loop when operating in Mode B 438 and first shows the UE 430 transmitting a periodic location updating request message 440 to the AP 420. The periodic location updating request message is forwarded in 445 to the CN 410 and a location updating accept message 450 returned to the AP 420, which in turn is forwarded in 455 to the UE 430. At this juncture, the AP 420 also stores the content of the Location Updating Accept message from the CN 410 for later use.

A timer, for example timer T3312_mode_A timer 460 is started. Thereafter periodic location updates are performed, as shown, with UE 430 transmitting a periodic location updating request message 470 to the AP 420. Notably, the AP in 475 uses the previously stored content(s) of the Location Updating Accept message(s) from the CN 410 to fill in the locally generated Location Updating Accept message(s) that it sends to the UE. In some examples, the AP 420 never includes the follow on proceed information element in the locally generated message(s). The location updating accept message 485 is then sent in 485 to the UE 430. This loop continues N−1 times in 458.

In this manner, the AP 420 may extract and store in memory at least a part of a first update response message content, for subsequent use in intercepting further update request messages from the UE 430 and providing update response messages directly in response thereto. In this manner, a portion of the second (subsequent) update requests are not passed to the CN, thereby limiting the CN traffic to an acceptable level. The AP 420 is able to do this by the signal processor within the AP 420 creating a locally-generated (first) update response message, with information extracted from an earlier update response message, and sending it to the UE 430. It is noted that the AP 420 never includes the 'follow-on proceed' information element in locally generated Location Updating Accept messages, thereby preventing the UE 430 from sending additional MM messages to the CN 410, which would introduce the need for sequence number synchronisation.

Figure 5:
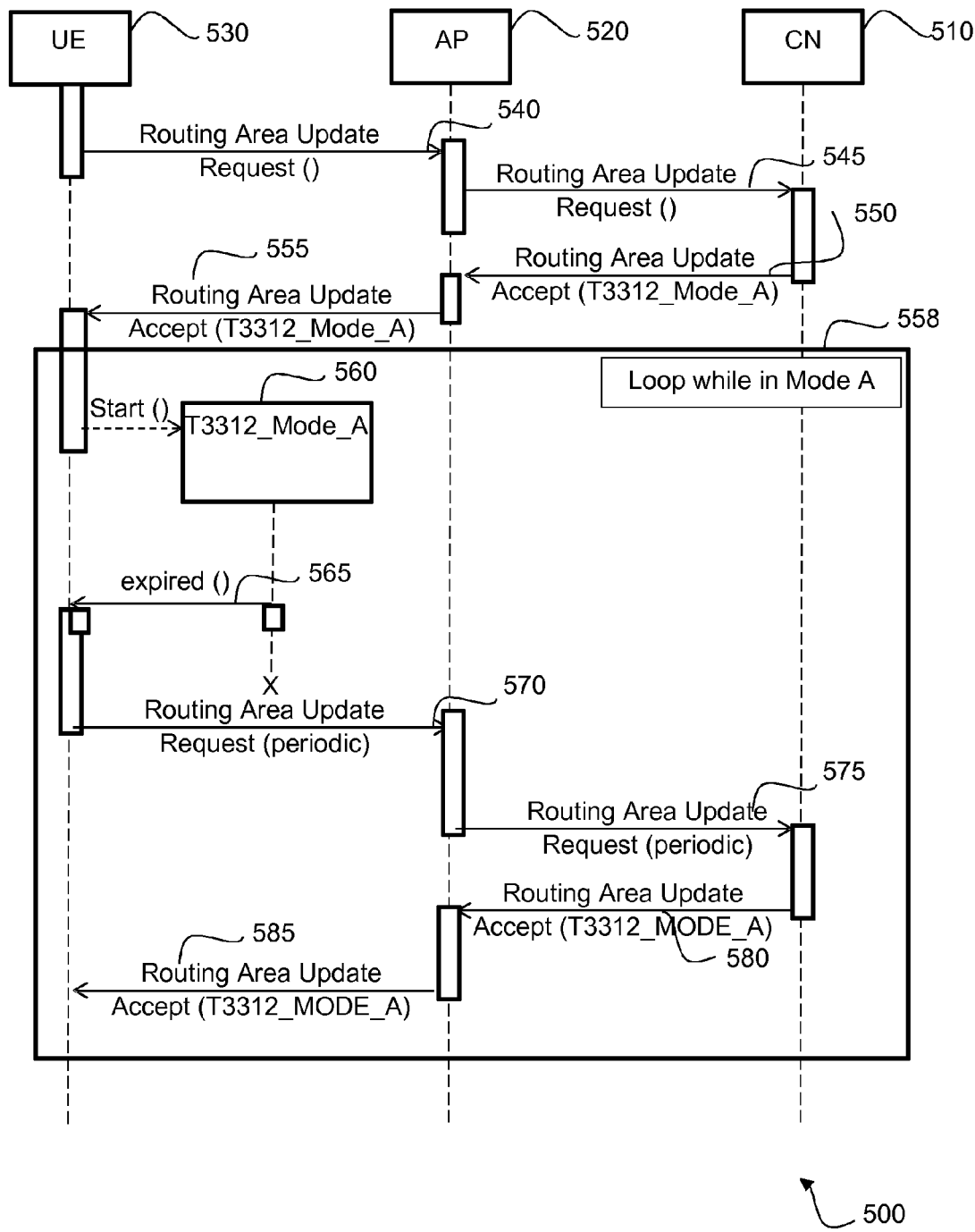
FIG. 5 shows a message sequence chart illustrating periodic routing area updating in Mode A according to standard UMTS network behaviour.

FIG. 5 shows an example message sequence chart 500 illustrating periodic routing area updating in Mode A (according to UMTS network behaviour). The example message sequence chart 500 illustrates communications between a terminal device, such as a user equipment (UE) 530, a base station, such as a small cell access point (AP) 520 and a core network (CN) 510. The example message sequence chart 500 first shows the UE 530 transmitting a routing area updating request message 540 to the AP 520. The routing area updating request message is forwarded in 545 to the CN 510 and a routing area updating accept message 550 returned to the AP 520, which in turn is forwarded in 555 to the UE 530.

A timer, for example timer T3312_mode_A timer 560 is started. Thereafter periodic routing area updates are performed, as shown, with UE 530 transmitting a periodic routing area updating request message 570 to the AP 520; the periodic routing area update request message being forwarded in 575 to the CN 510 and a routing area update accept message 580 returned to the AP 520, which in turn is forwarded in 585 to the UE 530. This loop 558 continues until the UE either becomes connected to the packet switched network for a purpose other than periodic routing area updating, such as transferring user data, or the UE leaves the cell.

Figure 6:
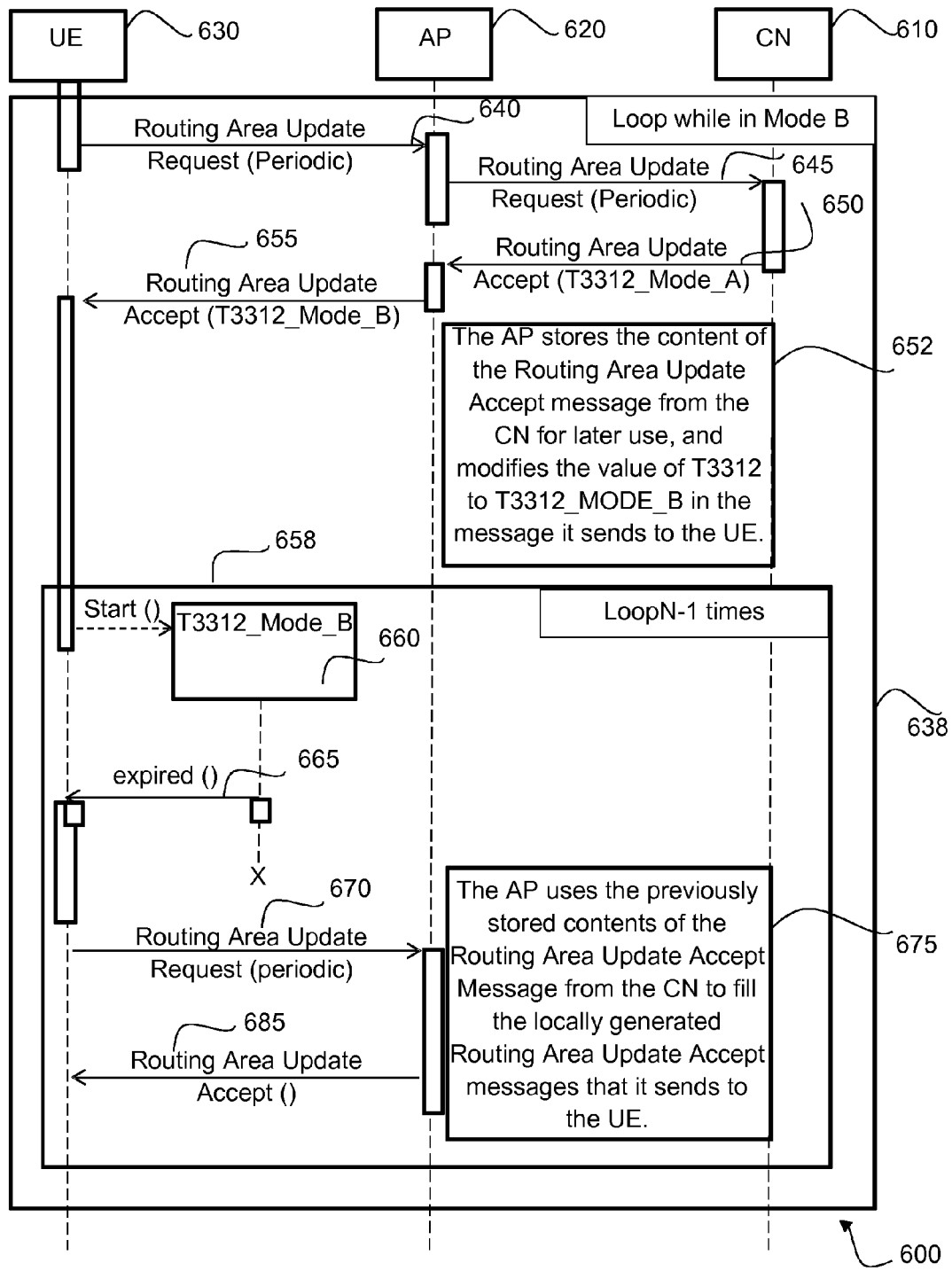
FIG. 6 shows a message sequence chart illustrating periodic routing area updating in Mode B according to examples of the present invention.

FIG. 6 shows periodic routing area updating in Mode B according to examples of the present invention. The example message sequence chart 600 illustrates communications between a terminal device, such as a user equipment (UE) 630, a base station, such as a small cell access point (AP) 620 and a core network (CN) 610. The example message sequence chart 600 commences a loop when operating in Mode B 638 and first shows the UE 630 transmitting a periodic routing area updating request message 640 to the AP 620. The periodic routing area update request message is forwarded in 645 to the CN 610 and a Routing Area Update Accept message 650 (identifying the timer T3312_Mode_A) is returned to the AP 620. At this juncture, the AP 620 also stores 652 the content of the Routing Area Update Accept message from the CN 610 for later use and modifies the value of the timer T3312 to T3312_Mode_B in the message that it sends in 655 to the UE 630.

A timer, for example timer T3312_mode_A timer 660 is started. Thereafter periodic routing area updates are performed, as shown, with UE 630 transmitting a periodic routing area updating request message 670 to the AP 620. Notably, the AP in 675 uses the previously stored content(s) of the routing area Update Accept message(s) from the CN 610 to fill in the locally generated routing area Update Accept message(s) that it sends to the UE 630. The routing area update accept message 685 is then sent in 685 to the UE 630. This loop continues N−1 times in 658.

In this manner, the AP 620 may extract and store in memory at least a part of a first update response message content, for subsequent use in intercepting further update request messages from the UE 630 and providing update response messages directly in response thereto. In this manner, a portion of the second (subsequent) update requests are not passed to the CN, thereby limiting the CN traffic to an acceptable level. The AP 620 is able to do this by control of counters within the AP 620 and/or modifying a first update response message (e.g. modifying a T3312 timer value) and sending it to the UE 630.

Figure 7:
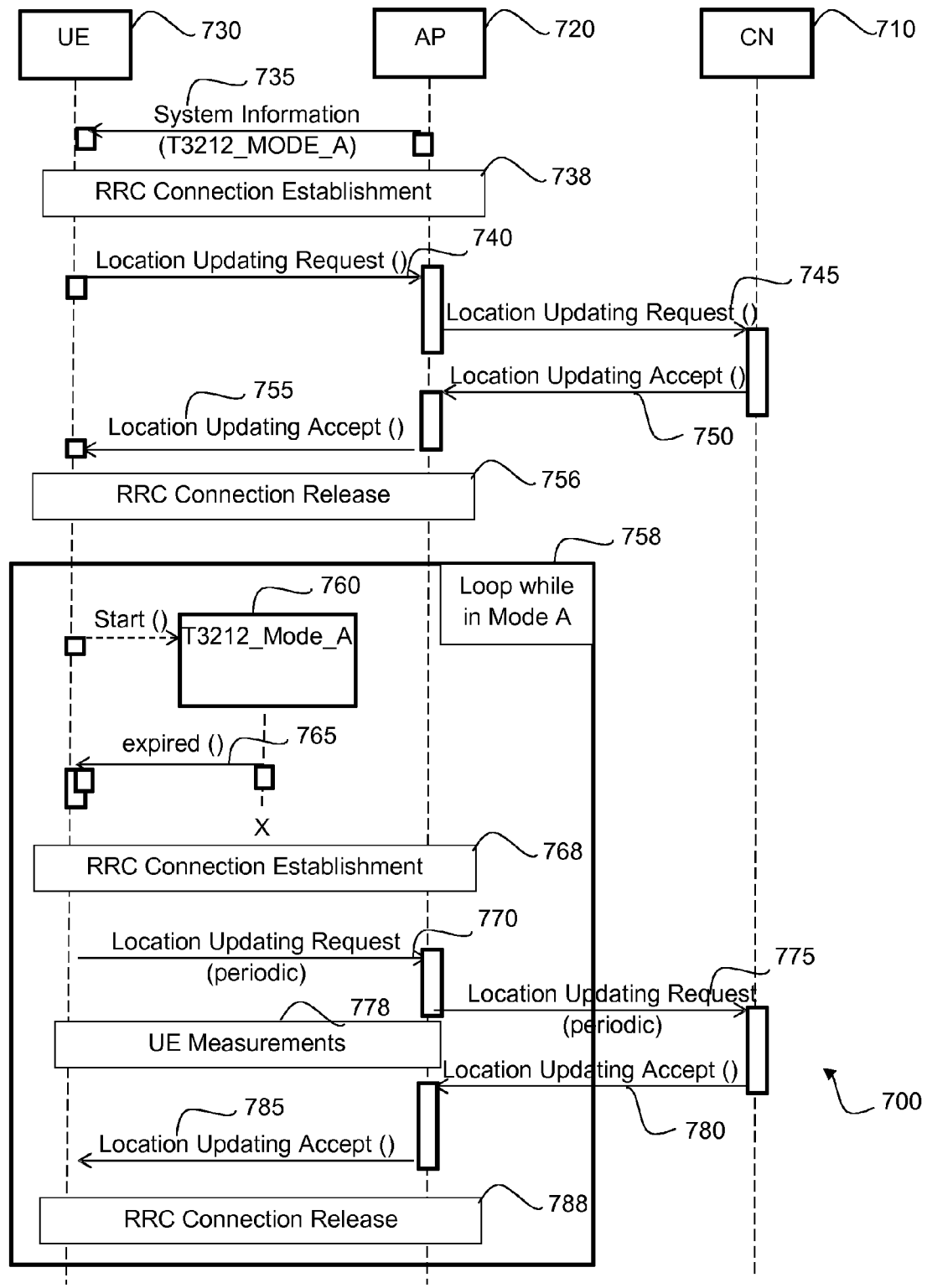
FIG. 7 shows a further message sequence chart illustrating periodic location updating in Mode A according to standard UMTS network behaviour.

FIG. 7 shows a further example message sequence chart 700 illustrating periodic location updating in Mode A (according to UMTS network behaviour). The example message sequence chart 700 illustrates communications between a terminal device, such as a user equipment (UE) 730, a base station, such as a small cell access point (AP) 720 and a core network (CN) 710. The example message sequence chart 700 first shows the AP 720 transmitting system information to UE 730 that includes the identifier of T3212_Mode_A timer in 735. A radio resource connection (RRC) establishment procedure 738 is then performed, following which the UE 730 transmits a location updating request message 740 to the AP 720. The location updating request message is forwarded in 745 to the CN 710 and a location updating accept message 750 returned to the AP 720, which in turn is forwarded in 755 to the UE 730. A RRC connection release procedure then occurs in 756.

A timer, for example timer T3212_mode_A timer 760 is started. Thereafter, an RRC establishment procedure 768 is then commenced and once established periodic location updates are performed, as shown, with UE 730 transmitting a periodic location updating request message 770 to the AP 720; the periodic location updating request message being forwarded in 775 to the CN 710 and a location updating accept message 780 returned to the AP 720, which in turn is forwarded in 785 to the UE 730. An RRC Connection release procedure 788 is then performed. This loop 758 continues until the UE either becomes connected to the circuit switched network for a purpose other than periodic location updating, such as making a voice call, or the UE leaves the cell.

Figure 8:
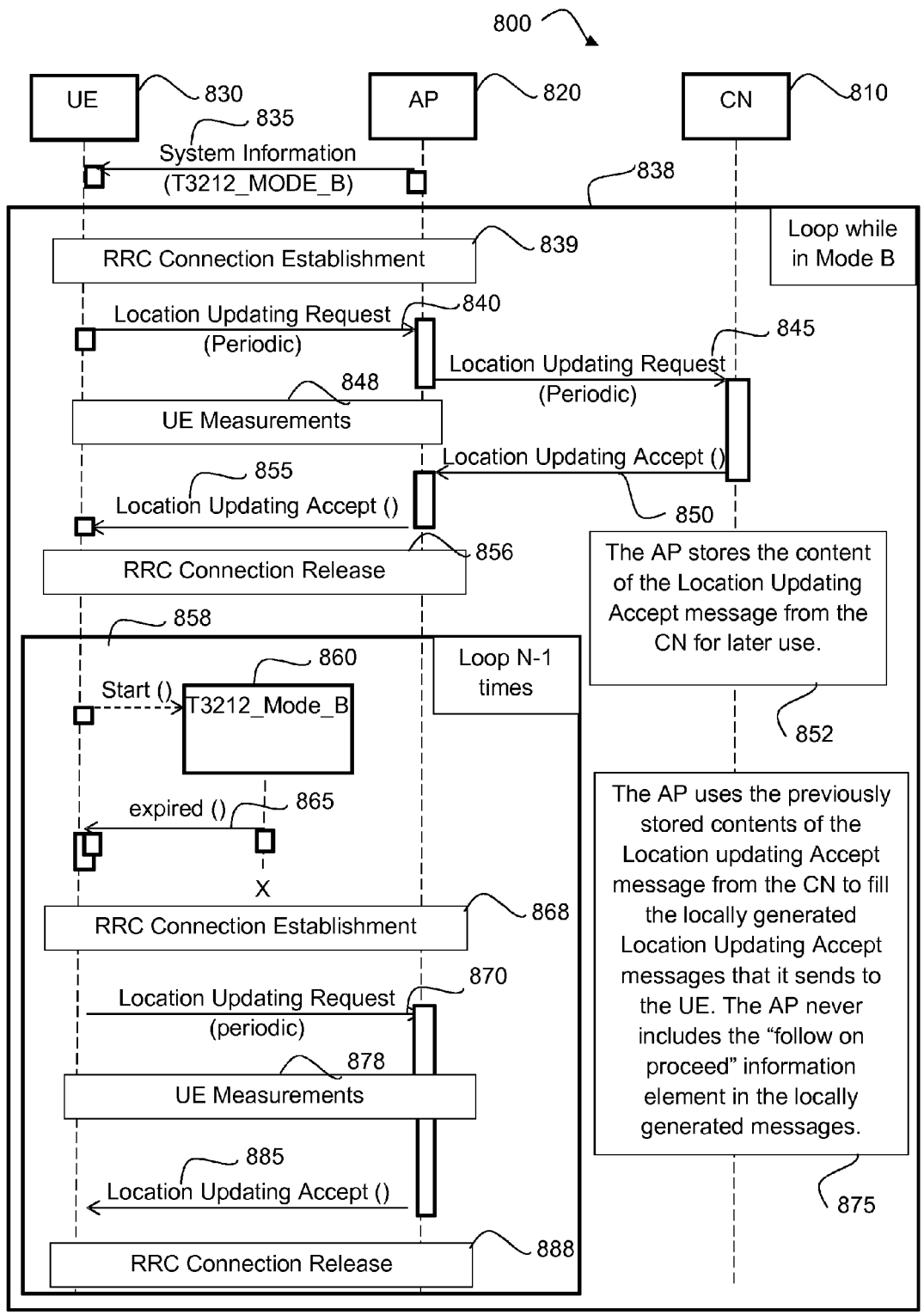
FIG. 8 shows a further message sequence chart illustrating periodic location updating in Mode B according to examples of the present invention.

FIG. 8 shows a further example message sequence chart 800 illustrating periodic location updating in Mode B, according to examples of the present invention.

The example message sequence chart 800 illustrates communications between a terminal device, such as a user equipment (UE) 830, a base station, such as a small cell access point (AP) 820 and a core network (CN) 810. The example message sequence chart 800 commences a loop when operating in Mode B 838 and first shows the AP 820 transmitting system information to UE 830 that includes the identifier of T3212_Mode_B timer in 835. A radio resource connection (RRC) establishment procedure 839 is then commenced, which starts with the UE 830 transmitting a periodic location updating request message 840 to the AP 820. The periodic location updating request message is forwarded in 845 to the CN 810. UE measurements 848 are then performed by the UE 830 and relayed to the AP 820. A location updating accept message 850 is returned to the AP 820, which in turn is forwarded in 855 to the UE 830. At this juncture, the AP 820 also stores the content of the Location Updating Accept message from the CN 810 for later use. A RRC connection release procedure then occurs in 856.

A timer, for example timer T3212_mode_B timer 860 is started. Thereafter, an RRC establishment procedure 868 is then commenced and, once established, periodic location updates are performed, as shown, with UE 830 transmitting a periodic location updating request message 870 to the AP 820. Again, UE measurements 878 are then performed by the UE 830 and relayed to the AP 820. Notably, the AP in 875 uses the previously stored content(s) of the Location Updating Accept message(s) from the CN 810 to fill in the locally generated Location Updating Accept message(s) that it sends to the UE. In some examples, the AP 820 never includes the follow on proceed information element in the locally generated message(s). The location updating accept message 885 is then sent to the UE 830. An RRC Connection release procedure 888 is then performed. This loop continues N−1 times in 858.

In this manner, the AP 820 may extract and store in memory at least a part of a first update response message content, for subsequent use in intercepting further update request messages from the UE 830 and providing update response messages directly in response thereto. In this manner, a portion of the second (subsequent) update requests are not passed to the CN, thereby limiting the CN traffic to an acceptable level. The AP 820 is able to do this by the signal processor within the AP 820 creating a locally-generated (first) update response message, with information extracted from an earlier update response message, and sending it to the UE 830. It is noted that the AP 820 never includes the 'follow-on proceed' information element in locally generated Location Updating Accept messages, thereby preventing the UE 830 from sending additional MM messages to the CN 810, which would introduce the need for sequence number synchronisation.

Figure 9:
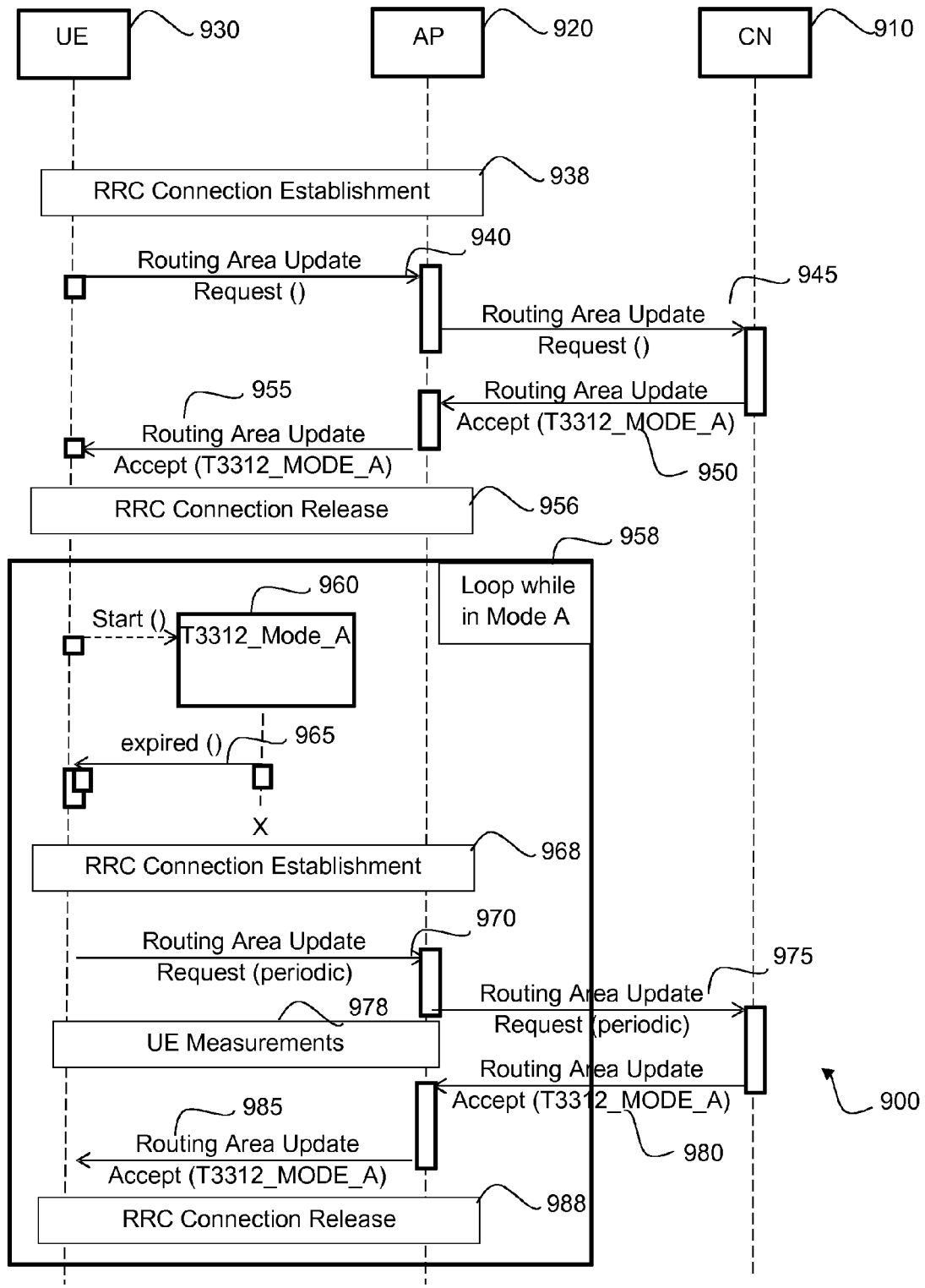
FIG. 9 shows a further message sequence chart illustrating a further message sequence chart illustrating periodic routing area updating in Mode A according to standard UMTS network behaviour.

FIG. 9 shows an example message sequence chart 900 illustrating periodic routing area updating in Mode A (in accordance with an UMTS™ network behaviour). The example message sequence chart 900 illustrates communications between a terminal device, such as a user equipment (UE) 930, a base station, such as a small cell access point (AP) 920 and a core network (CN) 910. The example message sequence chart 900 first shows a radio resource connection (RRC) establishment procedure 938, which starts with the UE 930 transmitting a routing area updating request message 940 to the AP 920. The routing area updating request message is forwarded in 945 to the CN 910 and a routing area updating accept message 950 returned to the AP 920 comprising a timer indication (of say a T3312_Mode_A), which in turn is forwarded in 955 to the UE 930. A RRC connection release procedure then occurs in 956.

The timer, for example timer T3312_mode_A timer 960 is started. Thereafter, an RRC establishment procedure 968 is then commenced and, once established, periodic routing area updates are performed, as shown, with UE 930 transmitting a periodic routing area updating request message 970 to the AP 920; the periodic routing area update request message being forwarded in 975 to the CN 910. Again, UE measurements 978 are then performed by the UE 830 and relayed to the AP 820. A routing area update accept message 980 is returned to the AP 920, which in turn is forwarded in 985 to the UE 930. An RRC Connection release procedure 988 is then performed. This loop 958 continues until the UE either becomes connected to the packet switched network for a purpose other than periodic routing area updating, such as transferring user data, or the UE leaves the cell.

Figure 10:
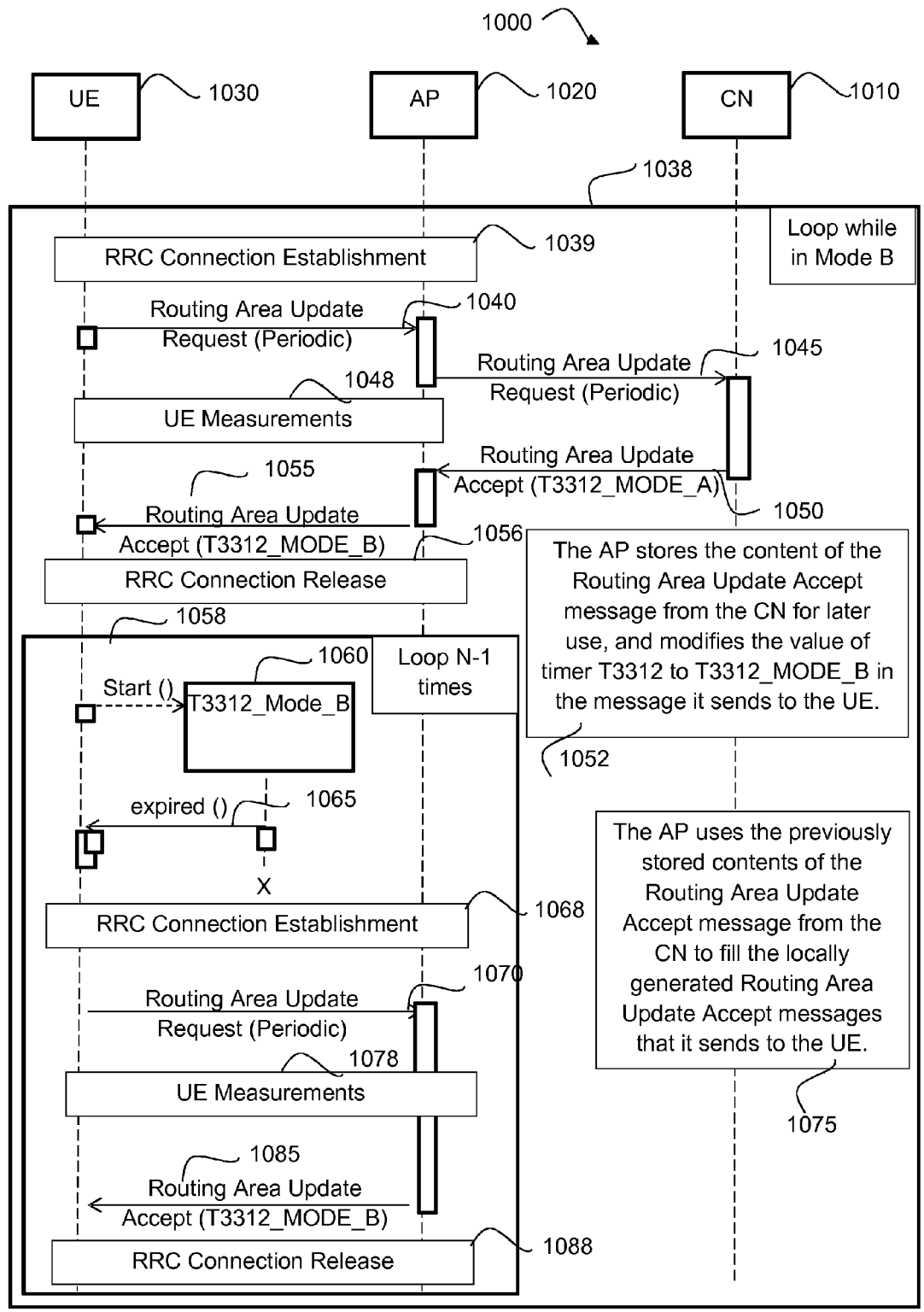
FIG. 10 shows periodic routing area updating in Mode B according to examples of the present invention.

FIG. 10 shows an example message sequence chart 1000 that illustrates periodic routing area updating in Mode B according to examples of the present invention. The example message sequence chart 1000 illustrates communications between a terminal device, such as a user equipment (UE) 1030, a base station, such as a small cell access point (AP) 1020 and a core network (CN) 1010. The example message sequence chart 1000 commences a loop when operating in Mode B 1038 and first shows a radio resource connection (RRC) establishment procedure 1039, which starts with the UE 1030 transmitting a periodic routing area updating request message 1040 to the AP 1020. The periodic routing area update request message is forwarded in 1045 to the CN 1010. UE measurements 1048 are then performed by the UE 1030 and relayed to the AP 1020. A Routing Area Update Accept message 1050 (identifying the timer T3312_Mode_A) is returned to the AP 1020. At this juncture, the AP 1020 also stores 1052 the content of the Routing Area Update Accept message from the CN 1010 for later use and modifies the value of the timer T3312 to T3312_Mode_B in the message that it sends in 1055 to the UE 1030. A RRC connection release procedure then occurs in 1056.

A timer, for example timer T3312_mode_B timer 1060 is started. Thereafter, an RRC establishment procedure 1068 is then commenced and, once established, periodic routing area updates are performed, as shown, with UE 1030 transmitting a periodic routing area updating request message 1070 to the AP 1020. Again, UE measurements 1078 are then performed by the UE 1030 and relayed to the AP 1020. Notably, the AP in 1075 uses the previously stored content(s) of the routing area Update Accept message(s) from the CN 1010 to fill in the locally generated routing area Update Accept message(s) that it sends to the UE 1030. The routing area update accept message 1085 is then sent in 1085 to the UE 1030. An RRC Connection release procedure 1088 is then performed. This loop continues N−1 times.

In this manner, the AP 1020 may extract and store in memory at least a part of a first update response message content, for subsequent use in intercepting further update request messages from the UE 1030 and providing update response messages directly in response thereto. In this manner, a portion of the second (subsequent) update requests are not passed to the CN 1010, thereby limiting the CN traffic to an acceptable level. The AP 1020 is able to do this by control of counters within the AP 1020 and/or modifying a first update response message (e.g. modifying a T3312 timer value) and sending it to the UE 1030.

Figure 11:
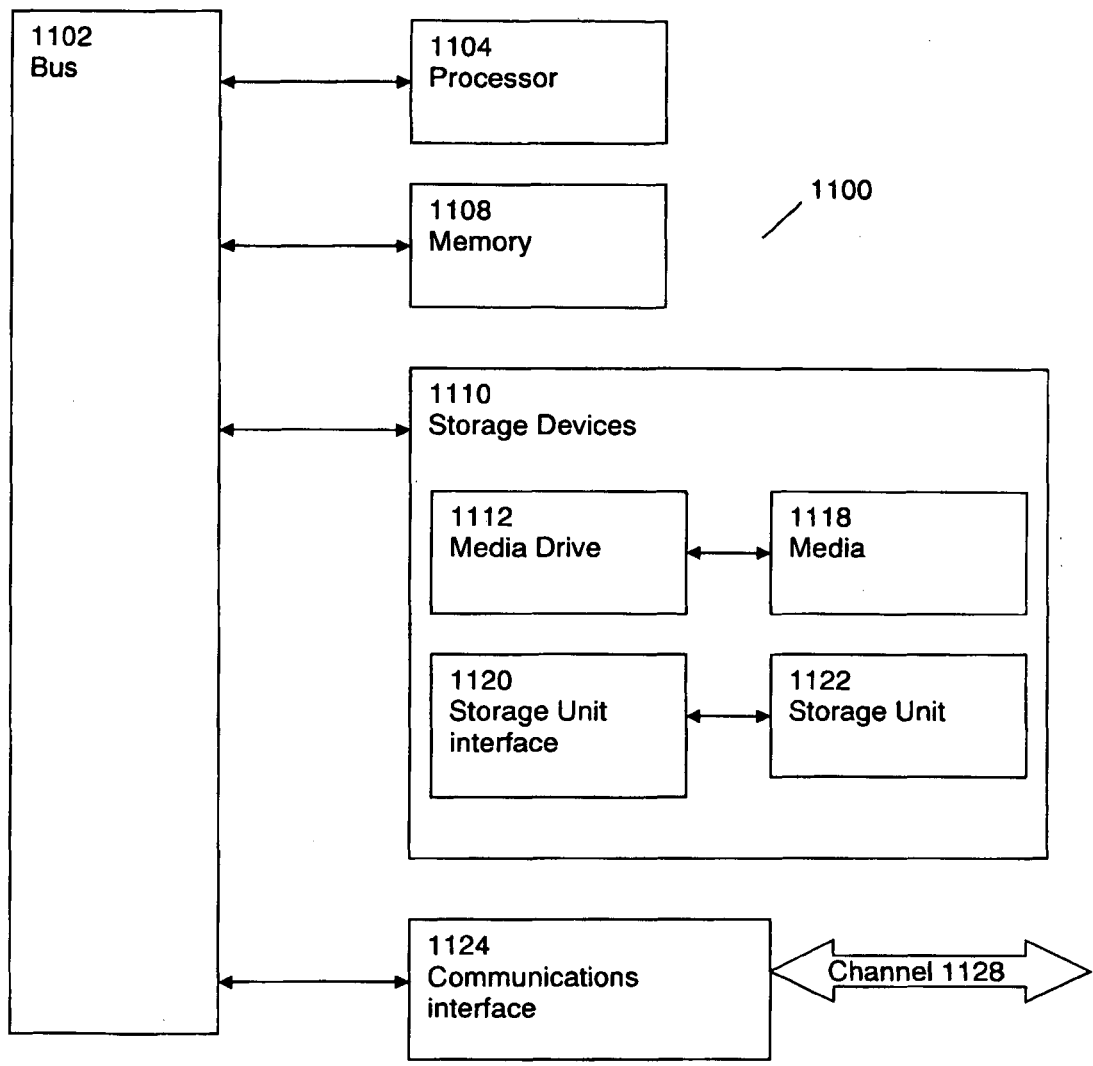
FIG. 11 illustrates a typical computing system that may be employed to implement signal processing functionality in example embodiments.

Referring now to FIG. 11, there is illustrated a typical computing system 1100 that may be employed to implement signal processing functionality in embodiments of the invention. Computing systems of this type may be used in base stations, access points, HNBs, base transceiver stations and wireless communication units. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special-purpose processing engine such as, for example, a microprocessor, microcontroller or other control module. In this example, processor 1104 is connected to a bus 1102 or other communications medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory (ROM) or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1118 may include, for example, a hard disk, floppy disk, magnetic tape, optical disk, CD or DVD, or other fixed or removable medium that is read by and written to by media drive 1112. As these examples illustrate, the storage media 1118 may include a computer-readable storage medium having particular computer software or data stored therein.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a universal serial bus (USB) port), a PCMCIA slot and card, etc. Software and data transferred via communications interface 1124 are in the form of signals which can be electronic, electromagnetic, and optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to tangible media such as, for example, memory 1108, storage device 1118, or storage unit 1122. These and other forms of computer-readable media may store one or more instructions for use by processor 1104, to cause the processor to perform specified operations. Such instructions, generally referred to as 'computer program code' (which may be grouped in the form of computer programs or other groupings), when executed, enable the computing system 1100 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1122, drive 1112 or communications interface 1124. The control module (in this example, software instructions or executable computer program code), when executed by the processor 1104, causes the processor 1104 to perform the functions of the invention as described herein. A software implementation of the invention, as employed at a network element for supporting communications between a subscriber unit and a core network (CN), comprises: receiving a first update request message from the subscriber unit; forwarding the first update request message to the core network; receiving from the CN a first update response message; extracting and storing at least a part of the first update response message content; forwarding the first update response message to the subscriber unit; receiving a second update request from the UE; creating a second update response message using the at least part of the stored content; and responding directly to the subscriber unit with the second update response message.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single signal processing module. However, the inventive concept may equally be implemented by way of a plurality of different functional units and processors to provide the signal processing functionality. Accordingly, it will be understood that the term 'signal processing module' used herein is intended to encompass one or more signal processing functional units, circuits and/or processors. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for collecting frequent measurements from terminal devices, for example subscriber communication unit/mobile station/user equipment within a cellular communication system have been described, wherein the aforementioned disadvantages with prior art arrangements have been substantially alleviated.

The invention claimed is:

1. A network element for supporting communications between a subscriber unit and a core network, wherein the network element comprises:
   a transceiver, memory and a signal processor operably coupled to the transceiver and memory, wherein the signal processor is arranged to:
   receive a first update request message from the subscriber unit;
   forward the first update request message to the core network;
   receive from the core network a first update response message;
   extract and store in memory at least a part of the first update response message content;
   forward the first update response message to the subscriber unit;
   receive at least one second update request from the subscriber unit;
   create at least one second update response message using the at least part of the stored content; and
   respond directly to the subscriber unit by sending the at least one second update response message;
   wherein the signal processor is arranged to use a time period between receiving the second update request message and sending the at least one second update response message to set up subscriber unit measurements in order to receive at least one measurement report from the subscriber unit.

2. The network element of claim 1 wherein the signal processor forwarding the first update response message to the subscriber unit comprises modifying a timer value contained within the first update response message.

3. The network element of claim 2 wherein the modified timer value sets a periodicity of an update message procedure employed by the subscriber unit.

4. The network element of claim 2 wherein the signal processor is arranged to increase a frequency of second update request messages employed by the subscriber unit by a multiplying integer factor.

5. The network element of claim 2 wherein a counter is arranged to increment upon reception of an update request message from a subscriber unit and wherein the signal processor is arranged to selectively forward a number of the at least one second update request messages to the core network based on the modified timer value.

6. The network element of claim 2 wherein the signal processor is arranged to intercept and process a plurality of second update request messages and forward a reduced number of processed second update request messages to the core network.

7. The network element of claim 2 wherein the update request message and associated timer value comprises at least one from the group consisting: a location update request message and a T3212 timer value, a routing area update request message and a T3312 timer value, and a tracking area update request message and a T3412 timer value.

8. The network element of claim 1 wherein the signal processor is arranged to modify a timer value contained within a broadcast system information message.

9. The network element of claim 8 wherein the modified timer value sets a periodicity of an update message procedure employed by the subscriber unit.

10. The network element of claim 1 wherein the signal processor is further arranged to perform radio resource control (RRC) connection establishment and RRC connection release procedures with the subscriber unit.

11. The network element of claim 10 wherein the RRC Connection establishment message comprises measurement information performed by the subscriber unit.

12. The network element of claim 1 wherein the update request message comprises at least one from the group consisting of: a location update request message for circuit switched communications, a routing area update request message for packet switched communications, and a tracking area update request message for Long Term Evolved (LTE) communications.

13. The network element of claim 1 wherein the network element is at least one of: an access point, a base station, a NodeB, an evolved NodeB.

14. The network element of claim 1 wherein the network element is implemented in an integrated circuit.

* * * * *